United States Patent [19]

Mishiro

[11] Patent Number: 4,728,843
[45] Date of Patent: Mar. 1, 1988

[54] ULTRASONIC VIBRATOR AND DRIVE CONTROL METHOD THEREOF

[75] Inventor: Shoji Mishiro, Kawasaki, Japan

[73] Assignee: Taga Electric Co., Ltd., Tokyo, Japan

[21] Appl. No.: 921,385

[22] Filed: Oct. 22, 1986

[30] Foreign Application Priority Data

Nov. 11, 1985 [JP] Japan .................................. 60-252526
Dec. 24, 1985 [JP] Japan .................................. 60-291731

[51] Int. Cl.[4] ................................................. H01L 41/08
[52] U.S. Cl. ................................. 310/325; 310/323; 310/328
[58] Field of Search ............... 310/314, 317, 316, 323, 310/325, 328

[56] References Cited

U.S. PATENT DOCUMENTS

| 2,834,158 | 5/1958 | Petermann | 310/325 X |
| 4,639,630 | 1/1987 | Rodloff | 310/328 |
| 4,652,786 | 3/1987 | Mishiro | 310/328 X |

FOREIGN PATENT DOCUMENTS

| 0070787 | 6/1977 | Japan | 310/328 |
| 55-125052 | 9/1980 | Japan . | |

Primary Examiner—Mark O. Budd
Attorney, Agent, or Firm—Oblon, Fisher, Spivak, McClelland & Maier

[57] ABSTRACT

The present invention comprises one or a plurality of electrostrictive elements, each of which is structured of an electrostrictive element body polarized in the direction of its thickness with two divisions of electrodes disposed on one face thereof and a common electrode disposed on the other face thereof, and metallic members placed on both sides of the electrostrictive element, or elements, and integrally fastened together by means of a fastening member. And these electrodes are supplied with A.C. voltages with their relative phase controlled, with their relative amplitude controlled, with both thereof combined, or the like, whereby the vibrator is enabled to provide linear vibrations, circular vibration, and elliptical vibration in any of desired directions at the output end portion of the vibrator on the plane perpendicular to the direction dividing the divisions of electrodes, and also enabled to be controlled for the ellipticity of the elliptical vibration and the vibrational direction of each of the vibrations so as to provide a wide variety of composite vibrations.

1 Claim, 11 Drawing Figures

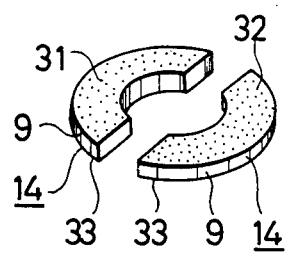
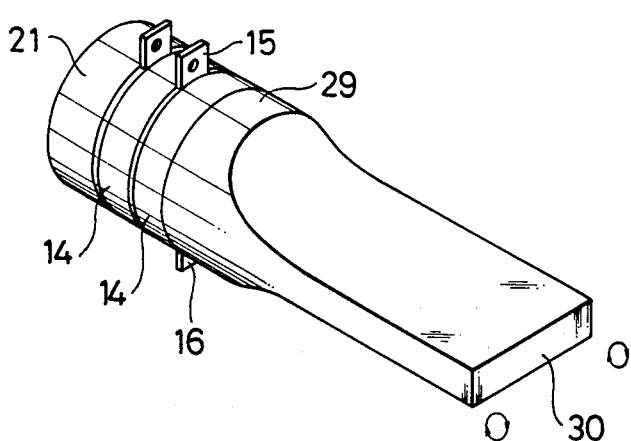
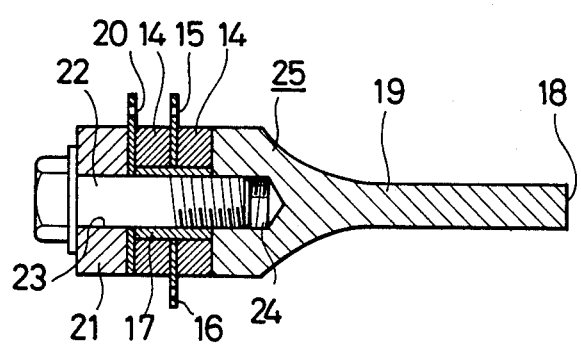
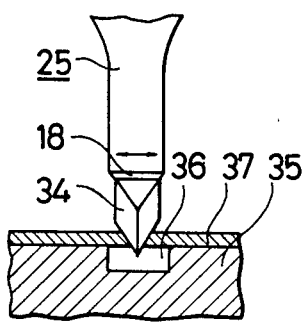

ULTRASONIC VIBRATOR AND DRIVE CONTROL METHOD THEREOF

FIELD OF THE INVENTION AND RELATED ART STATEMENT

The present invention relates to an ultrasonic vibrator generating a composite vibration in any desired direction and more particularly to an ultrasonic vibrator fit for use in an ultrasonic motor, etc. and a drive control method thereof.

As ultrasonic vibrators, in general, Langevin type vibrators structured of an annular electrostrictive element sandwiched between two metallic members and adapted to resonate as one body and π type vibrators made of ferrite magnetostrictive material formed into a cylindrical or π shape are widely used.

In terms of directions of vibration, there are axial vibrators vibrating in the axial direction and torsional vibrators vibrating in an axially symmetric manner. These vibrators are classed as the unidirectional vibrator since they generate vibration only in one—either axial or torsional—direction.

As an example of the arts constructing an ultrasonic motor of such a unidirectional vibrator, there is one disclosed in Japanese Patent Laid-open No. 55-125052/1980. According to this art, an axial vibrator is provided with a vibrating member at its output end portion. And the vibrating member is pressed against a rotor or like movable member with the normal line of the joint surface of the rotor slightly inclined with reference to the axial direction of the vibrator. Thereby, as a consequence, the end portion of the vibrating member makes an elliptical vibration and frictionally drives the rotor. In the ultrasonic motor of such a vibrating member type, however, there is such a defect that the contact portion between the vibrating member and the rotor wears out severely, and besides a loud noise is produced.

As an ultrasonic motor of a different type from that described above, there is one as shown in FIG. 11. That is, an axial vibrator 1 is employed, and to this axial vibrator 1 is integrally fastened a torsional conversion member 2, and thereby a vibrator 3 is formed. In one face of the torsional conversion member 2, there is formed a wide groove 4, and on the other face thereof, there is formed a beam-shaped protrusion 5 at a predetermined angle with the groove 4. And, the torsional conversion member 2 is provided with a rotor 8 attached thereto being pressed thereupon by means of a bolt 6 and a coil spring 7. If an axial vibration generated by the axial vibrator 1 is applied to the torsional conversion member 2, there is produced an elliptical vibration at the end portion of the beam-shaped portion 5 of the torsional conversion member 2 in the direction as indicated by the arrows and the rotor 8 in contact therewith is rotated in a clockwise direction as indicated by the thick arrow. And thus, an efficient ultrasonic motor is constructed.

In such means, however, there is a defect that the ellipticity of the elliptical vibration exhibiting the vibrational pattern at the output end portion cannot be controlled because the ellipticity is automatically determined by the form of the torsional conversion member 2. Therefore, it is unable to reduce the wear on the frictional surface between the rotor 8 and the beam-shaped protrusion 5, or make the drive at the maximum torque performed efficiently, by controlling the ellipticity so that it becomes most fit for the frictional driving. Also, the rotating direction of the rotor 8 cannot be controlled because the rotating direction of the rotor 8 is also automatically determined by the form of the torsional conversion member 2.

OBJECT AND SUMMARY OF THE INVENTION

A primary object of the present invention is the provision of an ultrasonic vibrator capable of generating composite vibrations while being enabled to be controlled for the ellipticity of the elliptical vibration at the output end portion and the vibrational direction at the output end portion; and a drive control method thereof.

Another object of the present invention is the provision of an ultrasonic vibrator capable, when applied to an ultrasonic motor, for example, of efficiently driving a member to be driven with small driving loss produced.

To achieve the above mentioned objects, the present invention comprises one or a plurality of electrostrictive elements, each of which is structured of an electrostrictive element body polarized in the direction of its thickness with two divisions of electrodes disposed on one face thereof and a common electrode disposed on the other face thereof, and metallic members placed on both sides of the electrostrictive element, or elements, and integrally fastened together by means of a fastening member. And these electrodes are supplied with A.C. voltages with their relative phase controlled, with their relative amplitude controlled, or with both thereof combined. Thereby, the vibrator is enabled to produce linear vibration, circular vibration, and elliptical vibration in any of desired directions at the output end portion of the vibrator on the plane perpendicular to the direction dividing the divisions of the electrodes, and also enabled to be controlled for the ellipticity of the elliptical vibration and the vibration direction at the output end portion. Thus, a wide variety of composite vibrations can be provided.

BRIED DESCRIPTION OF THE DRAWINGS

FIG. 6 is a perspective view showing a variant example of the composite vibrator;

FIG. 7 is a perspective view of a variant example of the electrostrictive element;

FIG. 8 is a side view in longitudinal section of vibrational patterns at the output end portion showing a variant example of the method for controlling the composite vibrator;

FIG. 9 is a side view in longitudinal section of the present invention being applied to a cutting device;

DESCRIPTION OF THE PREFERRED EMBODIMENTS

Figure 1:
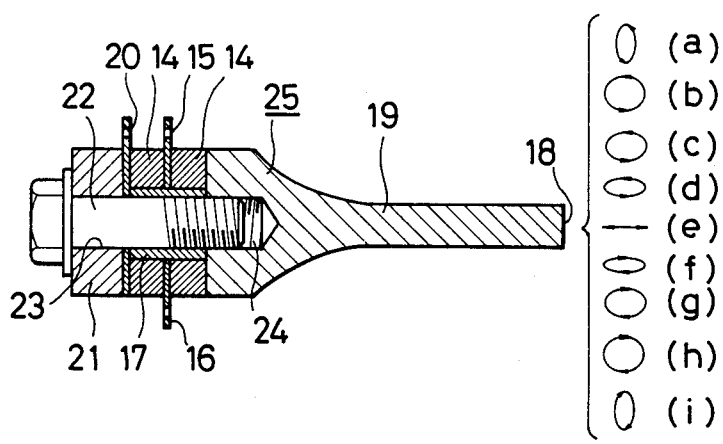
FIG. 1 is a side view in longitudinal section showing an embodiment of the present invention.
Figure 2:
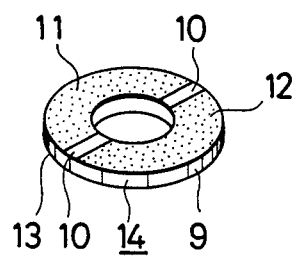
FIG. 2 is a perspective view of an electrostrictive element.
Figure 3:
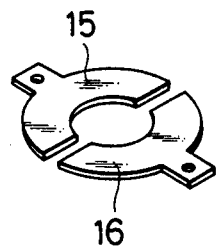
FIG. 3 is a perspective view of electrodes.

An embodiment of the present invention will be described with reference to FIG. 1 to FIG. 10. First, an annular electrostrictive element body 9 polarized in the direction of its thickness is provided. On one face of the electrostrictive element body 9, there are disposed electrodes 11, 12 divided into the two divisions with insulating portions 10 interposed therebetween, and on the other face thereof, there is disposed a common electrode 13 as an electrode covering the entire face, and thereby an electrostrictive element 14 is formed.

Then two pieces of the above described electrostrictive element 14 are prepared. These electrostrictive element 14 are combined so as to sandwich two sheets of U-shaped electrode plates 15, 16 therebetween, with the electrodes 11, 12 opposing each other and the insulating portions 10 aligned with each other. In the center of the electrostrictive elements 14, etc. there is inserted an insulating cylinder 17. Onto the face of the common electrode 13 of one electrostrictive element 14 is joined a metallic member 19, and onto the face of the common electrode 13 of the other electrostrictive element 14 is joined a metallic member 21 through a common electrode plate 20. The metallic member 19 is provided at one end thereof with an output end portion 18 being circular in cross-section, and the metallic member 19 is provided with an exponentially stepped portion toward the output end portion 18.

The combined electrostrictive elements 14 and the two metallic members 19 and 21 joined thereto are integrally and fixedly assembled by a bolt 22 as a fastening member. More particularly, the metallic member 21 is provided with a hole 23 made therein to allow the bolt 22 to be inserted therein and the metallic member 19 is provided with a threaded portion 24 made therein to allow the bolt 22 to threadedly engage therewith. Therefore, the electrostrictive elements 14 and the metallic members 19 and 21 are integrally fastened together with the bolt 22 inserted in the hole 23 and the insulating cylinder 17 and threadedly engaged with the threaded portion 24. Thus, a composite vibrator 25 is formed.

Then, the electrodes 11, 12 and the common electrode 13 are connected to a drive control circuit (not shown) through the electrode plates 15, 16 and the common electrode plate 20.

With the above described arrangement, the electrode plates 15, 16 and the common electrode plate 20 are connected to a drive power source in which phases are mutually controllable, and its driving frequency is adjusted to the axial resonant frequency. In this case, if the phase difference is set to zero, an in-phase parallel drive is effected and the output end portion 18 makes an axial resonant vibration as shown in FIG. 1(e) and exhibits a vibrational pattern the same as in an axial vibrator.

On the other hand, if the phase of the drive voltage applied to one electrode plate 16 is made to lead that to the other electrode plate 15, then the output end portion 18 makes an elliptical vibration elongated in the axial direction and rotating in a counterclockwise direction as shown in FIG. 1(d). As the degree of the phase lead is increased, the elliptical pattern becomes shorter in the axial direction and longer in the direction perpendicular to the axial direction as shown in FIG. 1(c), (b), and (a).

If, conversely, the phase is made to lag, the rotating direction of the elliptical vibration is inverted to a clockwise direction. And, as the phase difference is increased, the vibrational pattern varies as indicated in FIG. 1(f), (g), (h), and (i).

Figure 4:
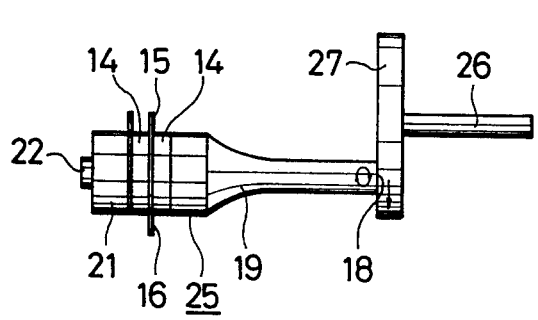
FIG. 4 is a side view showing the present invention being applied to an ultrasonic motor.
Figure 5:
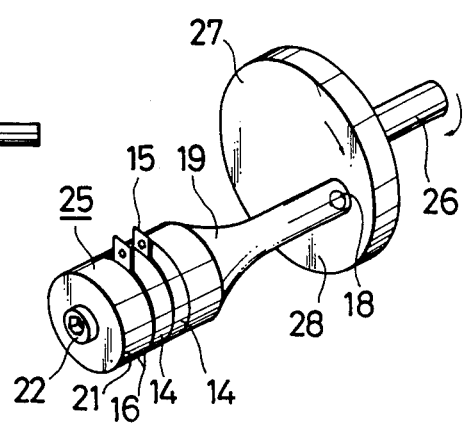
FIG. 5 is a perspective view of the same.

Then, an example of the above described composite variable 25 applied to an ultrasonic motor is shown in FIGS. 4 and 5. That is, a rotor 27 with an axle 26 provided in the center is prepared and the output end portion 18 of the composite vibrator 25 is pressed upon the surface 28 of the rotor 27. With such arrangement and in the state as shown in FIG. 4, for example, the vibration at the output end portion 18 is just in the state as indicated in FIG. 1(i), and the rotor 27 moves in the direction indicated by the thick arrow. If the relative phase is controlled so that the pattern as shown in FIG. 1(f) is exhibited, the moving speed of the rotor 27 becomes slower, and if the phases are made to come in phase as indicated in FIG. 1(e), the rotor stops. And, if the phase difference is increased in the opposite direction, the rotor 27 increases its speed in the reverse direction.

Further, the ultrasonic motor structured as described above can be applied in both rotating and linearly advancing directions. When the same is utilized in the linearly advancing manner, in particular, a linearly movable member is used instead of the rotor 27. If the side of the rotor 27 is fixed in the case of the linearly advancing arrangement, the side of the composite vibrator 25 moves. It is also possible to provide the drive for rotation in both directions by the use of only one composite vibrator 25, and the ellipticity thereof is also controllable. Therefore, it is enabled to provide the drive in the best contacting condition to minimize the wear on the surface of contact, and thus, improvement in the driving efficiency and reliability on the driving can be achieved.

FIG. 6 shows a variant example of the composite vibrator 25 of the present embodiment, wherein like parts to those already described referring to FIGS. 1 to 5 are denoted by like reference numerals, and therefore, description thereof will be omitted here. In the present case, the end of the metallic member 29 is formed into a flat plate to provide the output end portion 30. The vibrator of this shape is effective for use in linear driving, namely, in the case where the movable member moves linearly. Since the area of contact between the output end portion 30 and the member to be moved can be made larger, this design is suitable for such use as is relatively slow in movement and requires a larger torque.

Shown in FIG. 7 is a variant example of the electrostrictive element 14, of which the electrostrictive element body 9 is divided in advance into two semicircular-arc pieces and each thereof is provided with an electrode 31 or 32, and a common electrode 33.

FIG. 8 shows a variant example of the driving method of the composite vibrator 25. In this case, the driving voltage applied to the electrode plates 15, 16 of the composite vibrator 25 are provided with 180° of phase difference, or made out of phase, and set to the flexural resonant frequency. Thus, the resonant vibrational pattern at the output end portion 18 becomes a straight line perpendicular to the axis as indicated in FIG. 8(d).

Now, from the phase difference of 180° taken as reference, if the phase of the voltage applied to one electrode plate 16 is made to lead that to the other electrode plate 15, then the output end portion 18 makes a counterclockwise elliptical vibration having the major axis in the direction perpendicular to the axis as indicated in FIG. 8(c). As the degree of the phase lead is increased, the elliptical pattern becomes longer in the axial direction and shorter in the direction perpendicular thereto as indicated in FIG. 8(b) to (a).

Conversely, from the phase difference of 180° taken as reference, if the phase of the voltage applied to the electrode plate 16 is made to lag on that to the other electrode plate 15, then the rotational direction is reversed as indicated in FIG. 8(e), and as the degree of the phase lag is increased, the elliptical pattern becomes longer in the axial direction and shorter in the direction perpendicular thereto as indicated in FIG. 8(f) to (g).

If the phase difference in the driving voltages set to the flexural resonant frequency is maintained at 180° and their relative amplitude is controlled, the angle of inclination of the linear vibration can be varied as indicated in FIG. 8(h)–(i).

Further, if both the relative phase and the relative amplitude are controlled, the vibrational pattern at the output end portion 18 can be made to become an inclined elliptical vibration.

What is shown in FIG. 9 is an example of the composite vibrator 25 of the present embodiment applied to a cutting device. That is, a cutter 34 is fixed to the output end portion 18 of the composite vibrator 25. And the cutter 34 is positioned within a groove 26 made in a table 35 and this cutter 34 is allowed to cut into a sheet 37 to be cut. With such arrangement, if the output end portion 18 of the composite vibrator 25 is driven so as to make the vibration as indicated in FIG. 8(d), then the cutter 34 moves back and forth as indicated by the arrows, and thus, the sheet 37 is easily cut up by repetition of large acceleration provided by the ultrasonic vibration.

Figure 10:
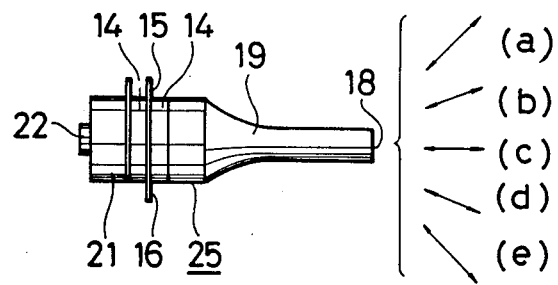
FIG. 10 is a side view of vibrational patterns at the output end portion showing a variant example of the method for controlling the compositve vibrator.
Figure 11:
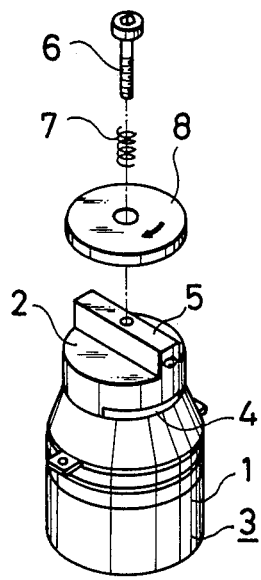
FIG. 11 is an exploded view in perspective showing an example of the prior art.

Further, FIG. 10 shows another variant example of the driving method of the composite vibrator 25. Here, the phases of the driving voltages applied to the electrode plates 15, 16 are maintained in phase and their relative amplitude is varied. Thereby, the vibrational pattern at the output end portion 18 becomes a straight line inclined with reference to the axial direction as indicated in FIG. 10. More particularly, if the applied voltages are of the same amplitudes, the vibrator makes the same resonant vibration as that of an ordinary axial vibrator as indicated in FIG. 10(c). However, if the driving voltage applied to the electrode plate 15 is made lower than the driving voltage applied to the electrode plate 16, the line inclines as indicated in FIG. 10(b), and if the difference is made larger, the inclination of the vibrational direction becomes larger as indicated in FIG. 10(a). If the difference is taken in the opposite direction, the line inclines, in analogous manner, in the other direction as indicated in FIG. 10(d) and (e). These angles of inclination cn be freely controlled by adjusting the relative amplitude of the driving voltages.

As described so far, the vibrational pattern of the composite variable 25 can be varied in many ways. Therefore, in the field of ultrasonic working, for example, the vibrator is applicable not only to the above described cutting device but also to a wide variety of applications for cutting, machining, welding, etc.

And, by changing not only the phase difference in the drive control voltages but also the difference in the amplitudes, a wide variety of compound vibrational patterns can be provided and the applications therefor can be greatly expanded.

Further, it is to be understood that many other embodiments than those described above and their variations as well as combinations thereof can be made within the scope of the present invention as defined in the appended claims.

What is claimed is:

1. A method for drive control of an ultrasonic vibrator, said method comprising the steps of:
    (a) providing an electrostrictive element formed of at least one electrostrictive element body polarized in the direction of its thickness (i.e., in the axial direction) with electrodes divided into two divisions disposed on one face thereof and a common electrode disposed on the other face thereof;
    (b) integrally fastening metallic members placed on both faces of said at least one electrostrictive element body together by means of a fastening member; and
    (c) applying the electrodes of said at least one electrostrictive element body with driving voltages the relative phases and amplitudes of which are controlled and changeable in both directions so that composite oscillations in the axial direction and in the directions perpendicular to the axial direction are obtained.

* * * * *